United States Patent [19]

Kennedy et al.

[11] Patent Number: 5,395,885

[45] Date of Patent: Mar. 7, 1995

[54] MULTI-ARM CATIONIC STAR-POLYMERS

[75] Inventors: Joseph P. Kennedy, Akron; Timea M. Marsalkó; Istvan J. Majoros, both of Stow, all of Ohio

[73] Assignee: The University of Akron, Akron, Ohio

[21] Appl. No.: 169,434

[22] Filed: Dec. 17, 1993

[51] Int. Cl.⁶ .................. C08F 293/00; C08F 297/00
[52] U.S. Cl. .................................... 525/98; 525/314; 525/319
[58] Field of Search .................... 525/314, 319, 98

[56] References Cited

U.S. PATENT DOCUMENTS

| | | | |
|---|---|---|---|
| 3,280,084 | 10/1966 | Zelinski | 525/271 |
| 4,342,849 | 8/1982 | Kennedy | 525/333.7 |
| 4,485,210 | 11/1984 | Neiditch | 525/53 |
| 4,497,748 | 2/1985 | Vitus | 525/314 |
| 4,524,188 | 6/1985 | Kennedy et al. | 525/333.7 |
| 4,814,405 | 3/1989 | Kennedy | 526/348.7 |
| 4,929,683 | 5/1990 | Kennedy et al. | 525/268 |
| 4,952,644 | 8/1990 | Wardle et al. | 525/410 |
| 5,066,730 | 11/1991 | Kennedy et al. | 525/319 |
| 5,102,966 | 4/1992 | Higashimura et al. | 526/209 |
| 5,122,572 | 6/1992 | Kennedy et al. | 525/314 |
| 5,164,477 | 11/1992 | Kobayashi et al. | 528/408 |
| 5,169,914 | 12/1992 | Kaszas et al. | 526/135 |
| 5,225,492 | 7/1993 | Kennedy et al. | 525/299 |

OTHER PUBLICATIONS

"Hydrodene Iodine/Zinc Iodine", Sawamoto, et al. Macromolecules, 20, 11, 1987, pp. 2693–2697.

"Star-Shaped Polymers by Living Cationic Polymerization, 6. Amphiphilic Star Shaped Block Copolymers of Vinyl Ethers with Carboxyl Groups: Synthesis and Host Guest Interaction", Kanaoka, Wasamoto, and Higashimura, Kyoto University, Makromol. Chem 194, 2035–45 (1993).

"Star Shaped Polymers by Living Cationic Polymerization, 5. Core-Functionalized Amphiphilic Star-Shaped Polymers of Vinyl Ethers with Hydroxyl Groups: Synthesis and Host-Guest Interaction", Kanoaka, Sawamoto, and Higashimura, Kyoto University, Macromolecules 26, 254–59 (1993).

"Star-Shaped Polymers by Living Cationic Polymerization, 4. Selective Host-Guest Interaction of Small Molecules by Amphiphilic Star-Shaped Polymers of Vinyl Ethers", Kanaoka, Sawamoto, and Higashimura, Kyoto University, Macromolecules 25, 6414–18 (1992).

"Star-Shaped Polymers by Living Cationic Polymerization, 3. Synthesis of Heteroarm Amphiphilic Star--Shaped Polymers of Vinyl Ethers with Hydroxyl or Carboxyl Pendant Groups" Kanaoka, Sawamoto and Higashimura, Kyoto University, Macromolecules 25, 6407–13 (1992).

(List continued on next page.)

Primary Examiner—James J. Seidleck
Assistant Examiner—I. Zemel
Attorney, Agent, or Firm—Oldham, Oldham & Wilson Co.

[57] ABSTRACT

The first synthesis of a multi-arm radial-star polyisobutylene is described. The synthesis occurred by the addition of excess divinylbenzene (DVB) linking reagent to a living polyisobutylene (PIB⊕), charge, i.e., by the "arm first" method under specific conditions. The radial structure of the star-PIB was proven by determining the molecular weight of a sample by light scattering, then selectively destroying the aromatic polydivinylbenzene core, and finally determining the molecular weight of the surviving aliphatic PIB arms. The synthesis strategy, kinetic observations during synthesis, and procedures leading to a representative star-PIB are described. This product whose $\overline{M}_w = 1,134,400$ g/mole with $\overline{M}_w/\overline{M}_n = 2.83$, contained ~90.3 mole % (~78 wt. %) PIB arms and ~9.7 mole % (~22 wt. %) aromatic core; thus the number of PIB arms emanating from the core was $\overline{N}_{n, arm} = 56$ or $\overline{N}_{w, arm}$ (weight average number of arms) = 110.

32 Claims, 2 Drawing Sheets

OTHER PUBLICATIONS

"Star-Shaped Polymers by Living Cationic Polymerization, 2. Synthesis of Amphiphilic Star-Shaped Block Polymers of Vinyl Ethers with Hydroxyl Groups", Kanaoka, Sawamoto, and Higashimura, Kyoto University, Macromolecules 24(21), 5741–45 (1991).

"Star-Shaped Polymers by Living Cationic Polymerization, 2. Synthesis of Star-Shaped Polymers of Alkyl Vinyl Ethers", Kanaoka, Sawamoto, and Higashimura, Kyoto University, Macromolecules 24, 2309–13 (1991).

"Tri-Armed Star Polymers by Living Cationic Polymerization. 3. Synthesis of Tri-Armed Star Poly(p-Methoxystyrene)" Shohi, Hajime; Sawamoto, Mitsuo; Higashimura, Toshinobu, Makromol. Chem., 193(8), 2027–35 (1992).

"Tri-Armed Star Polymers by Living Cationic Polymerization, 1. Trifunctional Initiators for Living Polymerization of Isobutyl Vinyl Ether" Shohi, Hajime; Sawamoto, Mitsuo; Higashimura, Toshinobu, Macromolecules, 24(17), 4926–3, (1991).

"New Telechelic Polymers and Sequential Copolymers by Polyfunctional Initiator-Transfer Agents (Inifers). 10. Three-Arm Star Telechelic Polyisobutylenes Carrying Chlorine, Olefin, or Primary Alcohol Endgroups", Kennedy, Joseph P.; Ross, Louis R.; Lackey, Jeffrey E.; Nuhken, Oskar, Polym. Bull. (Berlin), 4(1–2), 67–74 (1981).

"New Telechelic Polymers and Sequential Copolymers by Polyfunctional Initiator-Transfer Agents (Inifers). II. synthesis and characterization of $\alpha,\omega$-di(tert-chloro)Polyisobutylenes", Kennedy, Joseph P.; Smith, Robert Alan, Polym. Chem. Ed., 18(5), 1523–37 (1980).

"New Telechelic Polymers and Sequential Copolymers by Polyfunctinal Initiator-Transfer Agents (Inifers). III. Synthesis and Characterization of Poly($\alpha$-methylstyrene-b-isobutylene-b-$\alpha$-methylstyrene)", Kennedy, Joseph P.; Smith, Robert Alan, J. Polym. Sci., Polym. Chem. Ed., 18(5), 1539–46 (1980).

MULTI-ARM CATIONIC STAR-POLYMERS

The research disclosed in this application was supported by the National Science Foundation under Grant DMR-89-20826.

TECHNICAL FIELD

The invention described herein pertains generally to multi-arm star polymers, e.g., star polyisobutylene, prepared by cationic synthetic techniques by the addition of excess difunctional linking reagent, e.g., divinylbenzene (DVB), to a living polyolefin, e.g., polyisobutylene (PIB⊕) charge, by the "arm first" method.

BACKGROUND OF THE INVENTION

Multi-arm radial or star polymers are of great practical and theoretical interest. Since the late sixties, a large number and variety of such radial or star homopolymers and block polymers have been prepared, mainly by anionic techniques. Such prior art work has included the contributions of Dr. Paul Rempp et al. regarding pioneering work on star polystyrenes, e.g., J. G. Zilliox, P. Rempp, and J. Parrod, *J. Polymer Sci.*, C(22), 145 (1968), and P. Lutz and P. Rempp, *Makromol. Chem.*, 189, 1051 (1988). Polydiolefin and block copolymer stars were pioneered by Fetters et al., e.g., L.-K. Bi and L. J. Fetters, *Macromolecules*, 9(5), 732 (1976) and U.S. Pat. No. 3,985,830 (1976) and also discussed by Roovers et al., e.g., L. L. Zhou, N. Hadjichristidis, P. M. Toporowski, and J. Roovers, *Rubber Chem. Tech.*, 65(2), 303 (1992). Poly(tert-butyl acrylate) stars were synthesized by C. Tsitsilianis, P. Lutz, S. Graff, J.-P. Lamps, and P. Rempp, *Macromolecules*, 24(22), 5897 (1991) while poly(ethylene oxides) were discussed by Y. Gnanou, P. Lutz, and P. Rempp, *Makromol. Chem.*, 189, 2885 (1988). Polyisoprene stars were prepared by N. Hadjichristidis, A. Guyot, and L. J. Fetters, *Macromolecules*, 11(4), 668 (1978). And various hetero-arm stars are discussed by C. Tsitsilianis, S. Graff, and P. Rempp, *Eur. Polym. J.*, 27(3), 243 (1991) and R. W. Pennisi and L. J. Fetters, *Macromolecules*, 21(4), 1094 (1988). However, all of this previous work involved anionic star polymer synthesis.

Only recently has the synthesis of cationic star polymers been successfully prepared by scientists at Kyoto University, e.g., (1) "Star-Shaped Polymers by Living Cationic Polymerization, 6. Amphiphilic Star-Shaped Block Copolymers of Vinyl Ethers with Carboxyl Groups: Synthesis and Host-Guest Interaction", Kanaoka, Sawamoto, and Higashimura, Kyoto University, *Makromol. Chem.* 194, 2035–46 (1993), (2) "Star-Shaped Polymers by Living Cationic Polymerization, 5. Core-Functionalized Amphiphilic Star-Shaped Polymers of Vinyl Ethers with Hydroxyl Groups: Synthesis and Host-Guest Interaction", Kanaoka, Sawamoto, and Higashimura, Kyoto University, *Macromolecules* 26, 254–59 (1993), (3) "Star-Shaped Polymers by Living Cationic Polymerization, 4. Selective Host-Guest Interaction of Small Molecules by Amphiphilic Star-Shaped Polymers of Vinyl Ethers", Kanaoka, Sawamoto, and Higashimura, Kyoto University, *Macromolecules* 25, 6414–18 (1992), (4) "Star-Shaped Polymers by Living Cationic Polymerization, 3. Synthesis of Heteroarm Amphiphilic Star-Shaped Polymers of Vinyl Ethers with Hydroxyl or Carboxyl Pendant Groups", Kanaoka, Sawamoto, and Higashimura, Kyoto University, *Macromolecules* 25, 6407–13 (1992), (5) "Star-Shaped Polymers by Living Cationic Polymerization, 2. Synthesis of Amphiphilic Star-Shaped Block Polymers of Vinyl Ethers with Hydroxyl Groups", Kanaoka, Sawamoto, and Higashimura, Kyoto University, *Macromolecules* 24(21), 5741–45 (1991), and (6) "Star-Shaped Polymers by Living Cationic Polymerization, 2. Synthesis of Star-Shaped Polymers of Alkyl Vinyl Ethers", Kanaoka, Sawamoto, and Higashimura, Kyoto University, *Macromolecules* 24, 2309–13 (1991). However, all of the Kyoto University work requires the use of vinyl ether linking compounds shown generically below.

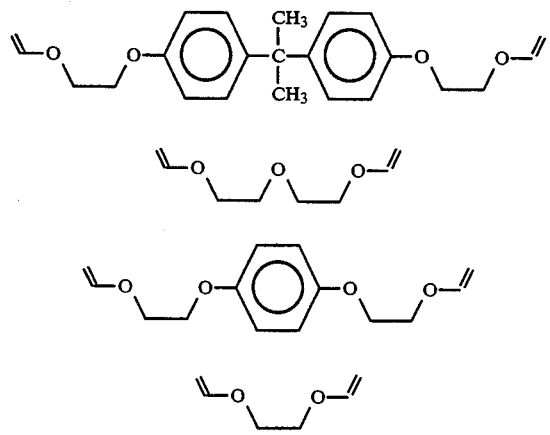

Kennedy et al. has synthesized three-and four-arm star polyisobutylenes by direct initiation, see J. P. Kennedy, L. R. Ross, J. E. Lackey, and O. Nuyken, *Polym. Bull.*, 4(½), 67 (1981) and K. J. Huang, M. Zsuga and J. P. Kennedy, *Polym. Bull.*, 19(1), 43 (1988). However, multi-armed stars using non-polar linking agents, and additionally using polyolefin, e.g., polyisobutylene, as the composition of the arms, has not heretofore been possible.

SUMMARY OF THE INVENTION

In accordance with the present invention, there is provided a synthetic procedure for the synthesis of multi-arm polymers, prepared by cationic synthetic techniques.

It is an object of this invention to provide a procedure which can be used to synthesize polyisobutylene star polymers cationically by the addition of excess divinylbenzene linking reagent to a living polyisobutylene charge.

It is still another object of this invention to provide a synthetic route to polyolefin based, cationically synthesized, star polymers which have essentially no residual unsaturation subsequent to star formation.

It is yet another object of this invention to provide a novel composition-of-matter which has a hydrocarbon-based linking agent with at least three polyolefin arms attached to the core.

It is still yet another object of this invention to provide a novel composition-of-matter which has a difunctional linking agent core comprised of at least two molecules of difunctional linking agent with at least three polyolefin arms attached to the core.

It is a further object of this invention to provide a novel composition-of-matter which has a divinylbenzene core of at least two molecules of divinylbenzene with at least three polyisobutylene arms attached to the core.

It still a further object of this invention to provide a novel composition-of-matter which has at least two molecules of divinylbenzene in the core to which at least seven isobutylene arms are attached to the core, the composition being soluble in hydrocarbon solvents.

It is still yet a further object of this invention to provide a star polymer, useful as a viscosifier, particularly for oils, which can be synthesized without the need for a post-polymerization hydrogenation step.

These and other objects of this invention will be evident when viewed in light of the drawings, derailed description, and appended claims.

DETAILED DESCRIPTION OF THE DRAWINGS

Figure 1:
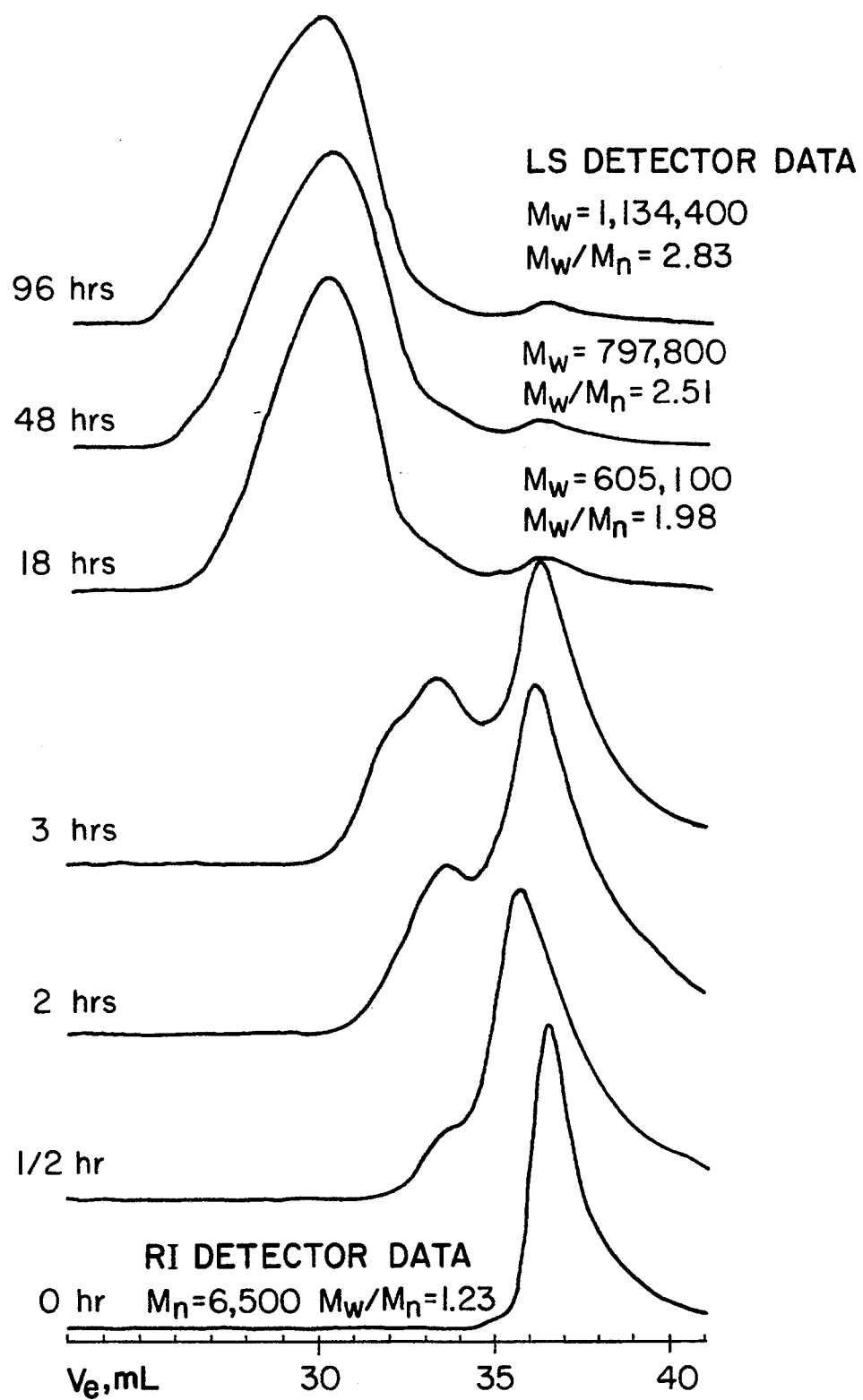
Figure 2:
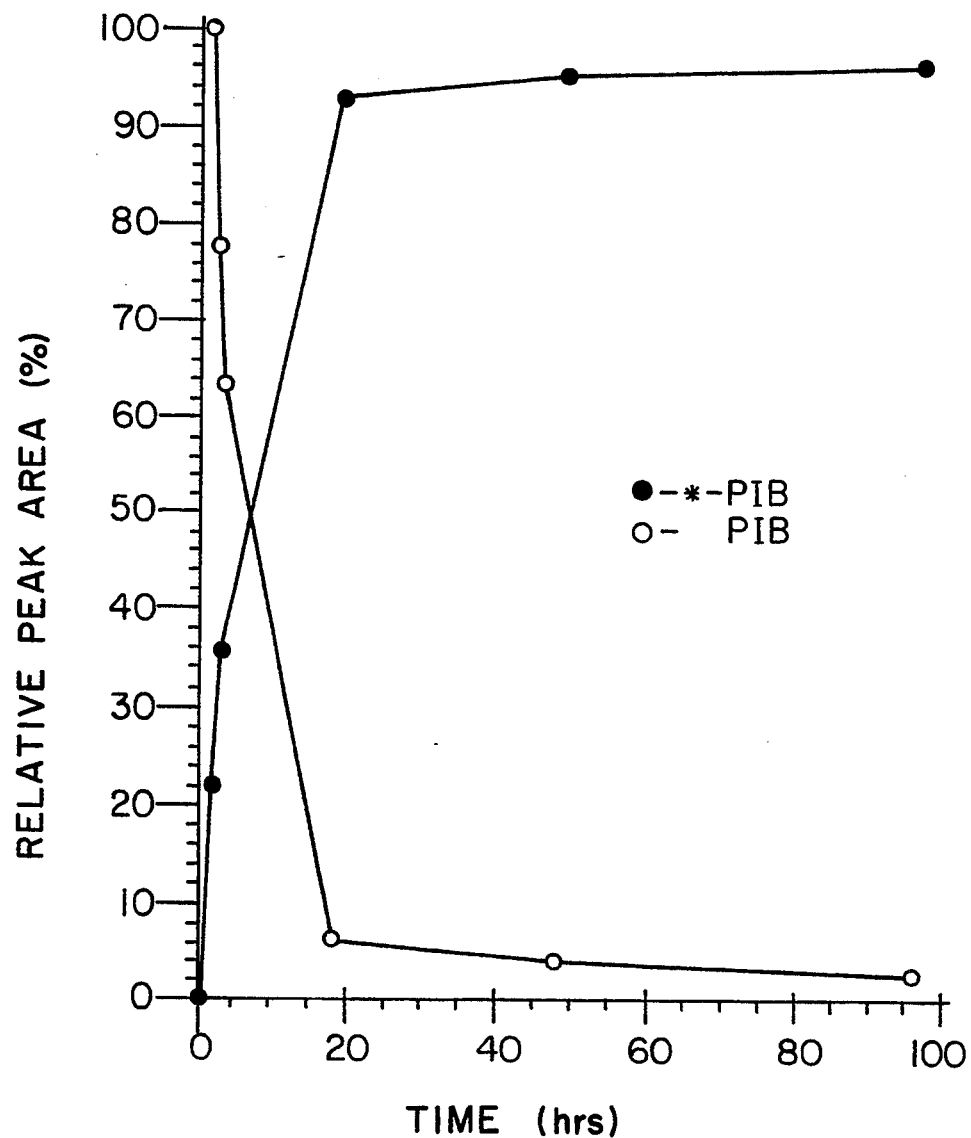

The invention may take physical form in certain parts and arrangements of parts, a preferred embodiment of which will be described in detail in the specification and illustrated in the accompanying drawings which form a part hereof, and wherein:

FIG. 1 is a series of refractive index (RI) traces of star-PIBs vs. elution volume and reaction time; and FIG. 2 is a plot of RI peak areas (%) of representative star-PIBs and PIBs obtained.

DETAILED DESCRIPTION OF THE INVENTION

The best mode for carrying out the invention will now be described for the purposes of illustrating the best mode known to the applicant at the time. The examples are illustrative only and not meant to limit the invention, as measured by the scope and spirit of the claims.

Reactants $TiCl_4$, 2,4,4-trimethyl-1-pentene (TMP), triethylamine (TEA), $CCl_4$, and $SnCl_2$ were obtained from Aldrich Chemical. $CH_2Cl_2$, hexanes (Hex), HCl, 30% $H_2O_2$, MeOH, and $Et_2O$ were obtained from Fisher Scientific. The hexanes and $CH_2Cl_2$ were refluxed under a $N_2$ atmosphere overnight and distilled from $CaH_2$. The synthesis of 2-chloro-2,4,4-trimethylpentane (TMPCl) was by hydrochlorination of 2,4,4-trimethyl-1-pentene, and vacuum distilled before use. Trifluoroacetic acid (TFA) was from Eastman Kodak Co. "High Purity" DVB, a mixture of 80.7% DVB (2.2:1 m:p isomers) and 18.5% ethylvinylbenzene (EVB) or synonymously ethylstyrene (1.34:1 m:p isomers) was provided by the DOW Chemical Company. The DVB was used after removing the inhibitor by column chromatography using a tert-butylcatechol column.

Equipment

A Waters Co. Gel Permeation Chromatography (GPC) assembly equipped with RI and UV detectors was used. (Waters 410 Differential Refractometer, 440 Absorbance Detector, WISP 7103, Nelson Analytical Interfaces). A Waters 150-CV GPC with a RI and a multi-angle laser light scattering detector (Dawn F. Wyatt Technology Corporation) was also used. Molecular weight determinations by the use of this equipment is discussed in U.S. Pat. No. 4,910,261 where in hereinby fully incorporated by reference. and also by M. K. Mishra, B. Sar-Mishra and J. P. Kennedy, *Polym. Bull.*, 16(1), 47 (1986), and H. Tompa, *Polymer Solution*, Butterworth Scientific Publications, London (1956).

Procedures

Polymerization

A representative experiment for the synthesis of star-PIB was carried out as follows: Living isobutylene (IB) polymerization was induced by the $TMPCl/TiCl_4$ initiating system in the presence of TEA as the electron pair donor; [IB]=0.89 mole/L, [TMPCl]=$2\times10^{-1}$ mole/L, [$TiCl_4$]:[TMPCl]=18:1, [TEA]:[TMPCl]=1:1, in 20 mL $CH_2Cl_2$:Hex=50:50 (vol.) solution at $-40°$ C. Reactions were performed in a series of manually agitated large test tubes ($\sim$75 mL) under $N_2$ in a "dry box". Upon the introduction of $TiCl_4$, the charge turned pale yellow. The intensity of the color increased slowly as the reactions progressed. Livingness, rates, and reproducibility of IB polymerization were ascertained in separate experiments. At $\sim$95% IB conversion, DVB (2 mL of 1.0 mole/L DVB in $CH_2Cl_2$:Hex=50/50) was added dropwise rapidly to the living $PIB^\oplus$ charges. Thus [DVB]:[TMPCl]=10:1 or [DVB+EVB]:[TMPCl]=12.5. Orienting experiments showed that a 10-fold molar excess of DVB over TMPCl produced multi-arm star-PIB with very little ($\sim$3%) PIB contamination. The exact time of the addition of the linking agent is of significance: DVB addition at lower than $-95\%$ IB conversion leads to undesirable IB/DVB copolymers and ill-defined low molecular weight product, whereas DVB addition after 100% IB conversion may result in the loss of activity of $PIB^\oplus$. Upon DVB addition, the pale yellow living $PIB^\oplus$ charge immediately turned dark orange suggesting rapid $PIB^\oplus + DVB \rightarrow PIB-DVB^\oplus$ cross-over. The intensity of this color slightly diminished after long ($>$90 hrs) reaction times. The charges were transparent, homogeneous and filterable without residue (for GPC determination). The reactions were terminated by the addition of 2 mL prechilled MeOH at $\frac{1}{4}, \frac{1}{2}$, 1, 2, 3, 18, 48, and 96 hours after DVB introduction. After quenching the charges into excess MeOH, the solvents were evaporated. The residues were extracted with $\sim$50 mL MeOH; the supernatant solutions were decanted, and the products dried in vacuo at ambient temperature for a week. The products were analyzed by gravimetry (yield, conversion) and GPC equipped with RI, UV, and/or LS detectors (molecular weight, hydrodynamic volume).

Core Destruction

A representative core destruction experiment was carried out as follows: Half a gram of star-PIB was dissolved in 50 mL $CCl_4$ in a 250 mL round bottom flask equipped with a Teflon ® coated magnetic stirring bar. Under stirring, first 50 mL TFA and subsequently 25 mL 30% $H_2O_2$ were added dropwise to the charge. The homogeneous charge was refluxed (67° C.) and $\sim$1 mL samples were withdrawn by pasteur pipettes into test tubes at 0, $\frac{1}{2}$, 1, 2, 4, 7, and 23 hrs. The excess in-situ formed trifluoroperacetic acid was destroyed by adding 1 mL of 10 wt. % aqueous $SnCl_2$ solutions. The samples (heterogeneous mixtures of yellow oil and colorless solid) were dried in vacuum at $\sim$40° C. for $\sim$3 hrs, 10 mL water were added and the heterogeneous system was extracted with $Et_2O$ (10 mL) for 16 hrs. The ether phase was separated by siphoning off by a pasteur pipette, dried over $MgSO_4$ for 24 hrs, and analyzed by GPC.

Similar experiments were also carried out with PIB and PDVB homopolymers.

Light Scattering

One mg star-PIB was dissolved in 1 mL of freshly distilled THF and 250 μL of this solution were injected into the GPC instrument equipped with the LS detector; λ=632.8 nm, dn/dc (refractive index increment)=0.126 cm$^3$/g.

Synthetic Strategy

The following Scheme I, outlines the strategy used to synthesize star-PIBs. The synthesis starts by the living polymerization of IB shown below. The cationic polymerization of isobutylene is well-known and the applicant incorporates the teachings of the following patents by reference, U.S. Pat. No. 5,225,492 (1993), U.S. Pat. No. 5,169,914 (1992), U.S. Pat. No. 5,122,572 (1992), U.S. Pat. No. 5,066,730 (1991), U.S. Pat. No. 4,929,683) (1990), U.S. Pat. No. 4,814,405 (1989), U.S. Pat. No. 4,524,188 (1985), and U.S. 4,342,849 (1982), wherein the synthesis of polymers is discussed. The abbreviation of ED used in the subsequent flow diagrams refers to an "electron donor", as defined in U.S. Pat. No. 5,169,914, which indicates that the tendency of, or "strength" of the electron pair donor to share its electrons with the initiator component, is referred to as its "donor number", DN, or its "donicity". The donor number is defined as the molar enthalpy value for the reaction of the donor with SbCl$_5$ as a reference acceptor in a $10^{-3}$M solution of dichloroethane.

In a preferred embodiment of this invention, the donor number of the electron pair donor will be at least twenty-five if undesirable side reactions are to be avoided, and less than fifty in order that practical reaction rates can be achieved. It should be recognized that the required donicity of the electron pair donors will depend on factors associated with the polymerization reaction as discussed in U.S. Pat. No. 5,169,914.

Exemplary of the numerous electron pair donors suitable for use are dimethyl acetamide, dimethyl formamide, dimethyl sulfoxide, hexamethylphosphoric triamide, N-methyl-2-pyrrolidinone, pyridine, tetramethylurea and many others. Some typical electron pair donors and their donor numbers are listed by Viktor Gutman in "The Donor-Acceptor Approach to Molecular Interactions", Plenum Press (1978).

It is known that both the temperature of the polymerization and the nature of the solvent selected for the reaction have a bearing on the nature of the electron donor required to produce the desired polymeric product. For example, it has been found that in order to produced polymers in which the $\overline{M}_w/\overline{M}_n$ is maintained at about, or below 1.5, a relatively narrow molecular weight distribution, the polymerization should be conducted at a temperature below about $-10°$ C., and a preferred range is from about $-40°$ C. to about $-80°$ C., although higher and lower temperatures may be used. When the reaction is conducted over about $-60°$ C., the donor number should be from at least thirty to no more than fifty if desirable molecular weight distributions are to be achieved.

Suitable solvents include normal, branched, or cyclic hydrocarbons, including their halogen substituted derivatives, mixtures of such compounds, and others. Suitable compounds include for instance, n-hexane, n-pentane, n-heptane, methyl chloride, ethyl chloride, methylene chloride, n-butyl chloride, benzene, cyclohexane, isopentane, and mixtures of such compounds and others.

There are many initiators which are useful in the polymerization reaction and in a preferred embodiment, would include 2-chloro-2,4,4-trimethylpentane (TMPCl), optionally, in the presence of a common ion salt, e.g., tetra-n-butylammonium chloride (n-Bu$_4$NCl) as discussed in U.S. Pat. No. 5,225,492, although other activators such as Friedel-Crafts halides, alkyl aluminum compounds such as monoalkyl aluminum dihalides, dialkyl aluminum halide, and trialkyl aluminum compounds represented generally as $R_xAlX_{(3-x)}$ are envisioned to be equally applicable, as are quaternary ammonium salts envisioned by the generic formula $R_4N^{\oplus}MtX^{\ominus}_{(n+1)}$ wherein R can be alkyl, alkenyl, aryl, alkaryl, aralkyl, cycloalkyl moieties and cycloalkyl radicals, and R is the same or different, Mt is a metal, X is a halide selected from the group consisting of chloride and bromide, x is an integer from 1 to 3 and n is an integer sufficient to satisfy the valence of the transition metal.

Additionally, other initiators such as

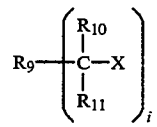

wherein $R_{9-11}$ are alkyl, aryl, alkaryl, or aralkyl groups and can be the same or different, and X is an acetate, other, hydroxyl or halogen and i is a positive whole number, are useful. In a preferred embodiment, $R_{10}$ and $R_{11}$ are methyl, phenyl or hydrogen, and $R_9$ is generally alkyl in nature, but can be almost anything, including a polymer wherein the chain length is proportional to the concentration of monomer available for reaction.

Without being limited, specific examples of such initiators would inlcude cumyl, dicumyl and tricumyl halides, particularly the chlorides, i.e., 2-chloro-2-phenyl propane (cumyl chloride), 1,4-di(2-chloro-ω-propyl)-benzene (di(cumyl chloride)), 1,3,5-tri(2-chloro-2-propyl)benzene (tri(cumyl chloride)), 2,4,4-trimethyl-2-chloropentane, 2-acetyl-2-phenylpropane (cumyl acetate), 2-propionyl-2-phenylpropane (cumyl propionate), 2-methoxy-2-phenylpropane (cumylmethyl ether), 1,4-di(2-methoxy-2-propyl)benzene (di(cumylmethyl ether)), 1,3,5-tri(2-methoxy-2-propyl)benzene (tri(cumylmethyl ether)), and similar compounds.

The co-initiators of the polymerization are generally Lewis acids of the formula $MY_n$ where M is titanium, aluminum, boron, zinc or tin, and Y is a halogen, prefeably chloride, bromide or fluoride, and n is a positive whole number.

The amount of the Lewis acid present in the system may vary, however, it is desirable that the number of moles of Lewis acid present at least be equal, and preferably exceed the combined moles of the initiator compound and the electron donor compound present. Furthermore, at least one mole of donor compound should be present for every ten moles of initiator compound present, and the use of about equal moles of such compounds is preferred.

A family of initiating systems based on organic acids or esters is equally applicable to this invention, as illustrated by the following formulae:

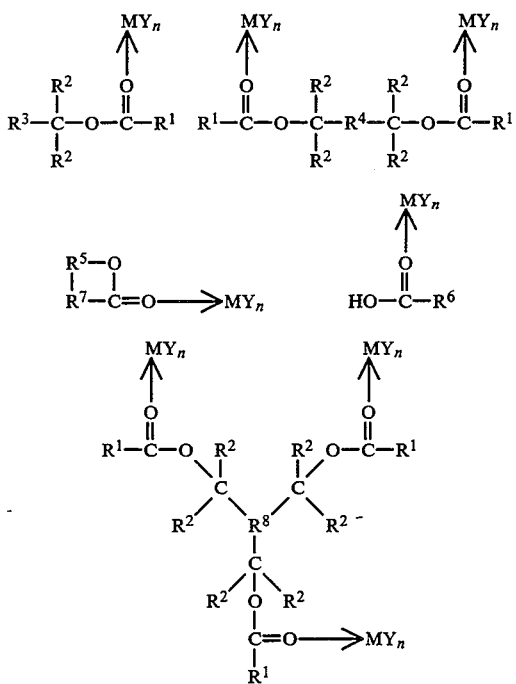

or organic ethers as illustrated in the following formulae:

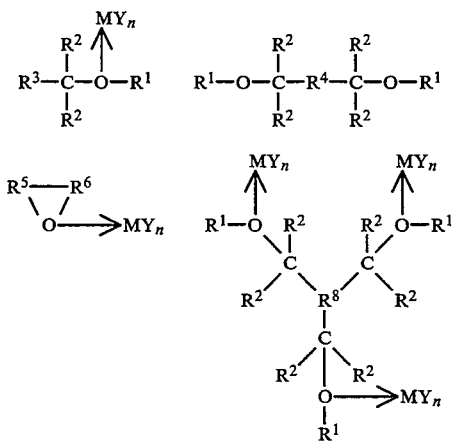

and wherein $R^1$ in the above formulae may be hydrogen, halogen, an organic moiety such as methyl and related alkyl, or aryl groups, preferably up to 14 to 20 carbons, alkylene groups such as —CH=CH$_2$ and related lower alkylene groups, preferably 2 to 8 carbons, and groups containing heteroatoms and related groups such as alkylene chloride, methylene to butylene alkoxy, preferably up to 14 to 20 carbons;

$R^2$ may be hydrogen, methyl and related alkyl groups containing preferably from 1 to about 14 to 20 carbons, and the $R^2$ groups may be the same or different;

$R^3$ can be methyl, or related alkyls of preferably 2 to 20 carbons, or aryls such as phenyl, cycloalkyls, or vinyl or allyl groups or a CH$_2$= group, in general $R^3$ can be the same as $R^2$;

$R^4$ may be —(CH$_2$)$_x$— or other moiety such as —CH$_2$—CH$_2$—, acetylenic, or arylene, or ethylenic, such as —CH=CH—, and related homologous groups, where x is from 1 to 20, and preferably 1 to 10 in value;

$R^5$ may be alkylenes such as —(CH$_2$)$_x$— and substituted alkylenes such as —((CH$_3$)$_2$C)$_x$—, and halogenated derivatives of the alkylenes and substituted alkylenes;

$R^6$ may the same as $R^1$ but preferably is limited to hydrogen or alkyls such as methyl, ethyl, etc., or aryl;

$R^7$ is an alkylene group containing carbon atoms to complete the lactone ring over the range of 3 to about 20 carbons or more or substituted derivatives thereof; and $R^8$ is a three valent organic moiety such as an aromatic ring which has at least three sites for bonding, or a carbon atom with at least three sites for bonding.

The above initiating systems are effective for the cationic polymerization of many monomers. While the invention has been described in the best mode known to the applicant at this time, the invention is not limited to cationic star polymers which consist of homopolyisobutylene arms. Equally applicable are other olefinic-based monomers which are polymerizable cationically, such as 3-methyl-1-butene, 4-methyl-1-pentene, the styrenes, α-methylstyrenes, etc., poly(β-pinene) and copolymers thereof, in addition to diolefin-based monomers, either nonconjugated or conjugated which are polymerizable cationically, such as butadiene, isoprene, piperylene, hexadienes, octadienes, and the cyclic analogs of these such as cyclopentadiene, 1,3-cyclohexadiene etc., and copolymers thereof and additionally copolymers of olefins and diolefins.

The preferred olefins of the invention have between from 2 to 20 carbons, but preferrably, from 4 to 8, while the diolefins of the invention have between 4 to 20 carbons, but preferrably from 4 to 8. The reaction process will produce polymers of different, but generally of uniform molecular weigths, for example from about 300 to in excess of a million. Such polymers can be low molecular weight liquid or viscous polymers having a molecular weight of from about 200–10,000 or solid waxy to plastic, or elastomeric materials having molecular weights of from about 100,000 to a million or more.

U.S. Pat. No. 5,225,492 (1993) which is hereinby fully incorporated by reference which teaches the synthesis of an amphiphilic block polymer of unimodal $\overline{M}_w, \overline{M}_n$ molecular weight distribution which is comprised of a hydrophobic block and a hydrophilic block polymer, e.g., an olefinic-based block and an alkyl vinyl ether block. Without being limited to such, an exemplary list of examples would include poly(isobutylene-b-methyl vinyl ether), poly(isobutylene-b-ethyl vinyl ether), poly(isobutylene-b-isobutyl vinyl ether), poly(isobutylene-b-β-chloroethyl vinyl ether), etc.

While the use of divinylbenzene has been described as a particularly effective linking reagent, there is no need to so limit the scope of the range of linking agents suitable for this linking reaction. In fact, a non-limiting exemplary list of suitable linking agents would include: divinyl or trivinyl aromatic compounds, e.g., m-divinylbenzene, p-divinylbenzene, 1,2-diisopropenylbenzene, 1,3-diisopropenylbenzene, 1,4-diisopropenylbenzene, 1,2,4-trivinylbenzene, 1,3,5-trivinylbenzene, 1,2,4-triisopropenylbenzene, 1,3,5-triisopropenylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,2-divinyl-3,4-dimethylbenzene, 1,5,6-trivinyl-3,7-diethylnaphthalene, 1,3-divinyl-4,5,8-tributylnaphthalene, 2,2′-divinyl-4-ethyl-4′-propylbiphenyl; various diepoxides, diketones an dialdehydes, either aliphatic or aromatic having up to 12 carbons, e.g., cyclohexane diepoxide, 1,4-pentane diepoxide, 1,5-hexane diepoxide, 2,4-hexane-di-one, 2,5-hexane-di-one, 2,6-heptane-di-one, 1,4-butanaedial, 1,5-pentanedial and 1,6-hexanedial. In a most preferred embodiment, the divinylbenzenes, both meta and para isomers are the most effective known to date.

Without being limited to such, a proposed sequence of reactions is now described representing the best mode known to the applicant at the time of the filing of this application. In a preferred embodiment of the invention, the monomer used is isobutylene. The choice of this monomer is especially beneficial when the targeted application is the formulation of a viscosifier. While anionically synthesized star polymers are currently in use as viscosifiers, they are based on diolefins, such as butadiene and/or isoprene. The resulting product of such formulation requires a post-polymerization hydrogenation step to remove residual unsaturation which exists in the star as initially synthesized, the polymerization of any diolefin resulting in a polymer with one unit of unsaturation remaining per monomer unit. Without the hydrogenation step, the residual unsaturation in the polymeric arms and/or potentially in the nucleus results in a product with insufficient thermal oxidative stability to achieve the desired result. This is not the case of a star based upon an olefinic arm, where the resulting polymerization synthesizes a product which does not possess any residual unsaturation, thereby allowing a producer to avoid the traditional post-processing hydrogenation.

For the purposes of this application, the following definitions will be employed to aid in the discussion. A polymeric "arm" is defined as a polymer which is synthesized using cationic polymerization chemistry. A polymeric "nucleus" is defined as any polymeric moiety which is not an "arm". To provide an illustrative example, when the cationically polymerizable monomer is isobutylene, and the linking agent is divinylbenzene containing a mixture of meta and para isomers, and typically also containing ethylstyrene (a mixture of meta and para isomers), then the "arm" is polyisobutylene and the "core" would be the moiety formed of divinylbenzene, ethylstyrene, and in some instances, may even contain minor amounts of isobutylene. The ethylstyrene may be thought of as a molecular "spacer".

Synthesis of Multi-Armed Star Polyisobutylenes

1. Living Polymerization of Isobutylene

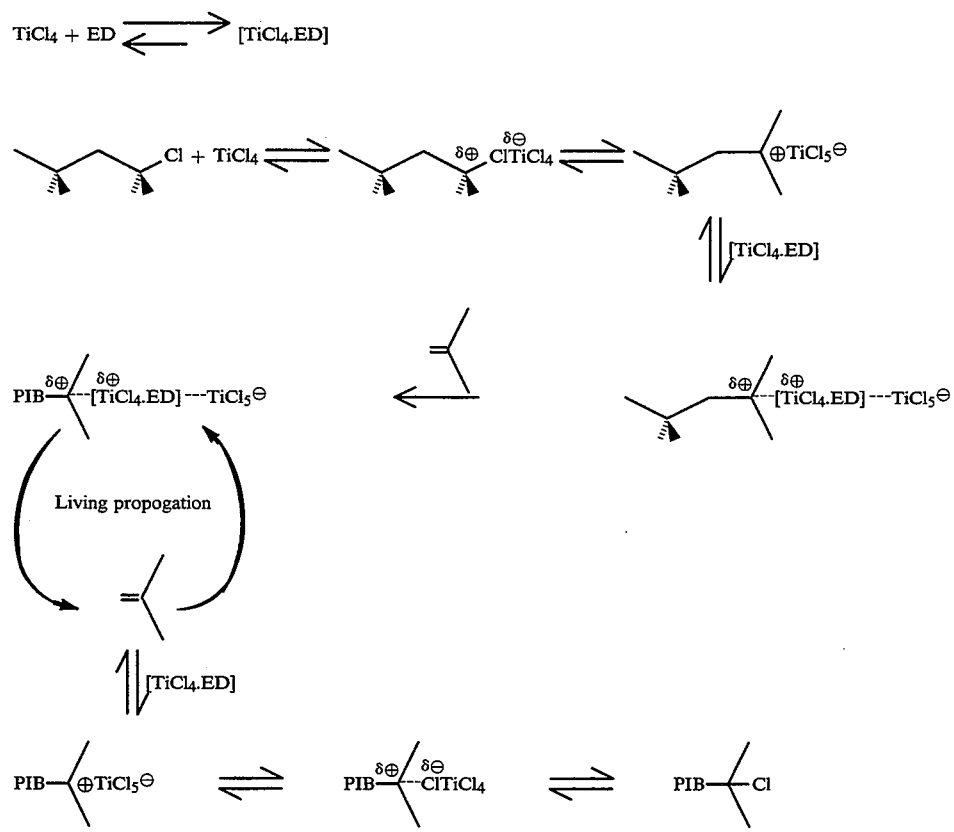

The next step is the addition of the DVB linking agent to the living PIB⊕ charge to effect the PIB⊕+DVB→PIB−DVB⊕ crossover. The scheme shows the various resonance structures expected from para and meta DVB. The reactions with para and meta EVB are discarded in that EVB does not lead to linking. The incorporated EVB merely increases the size of the cores.

2. PIB⊕+DVB→PIB−DVB⊕

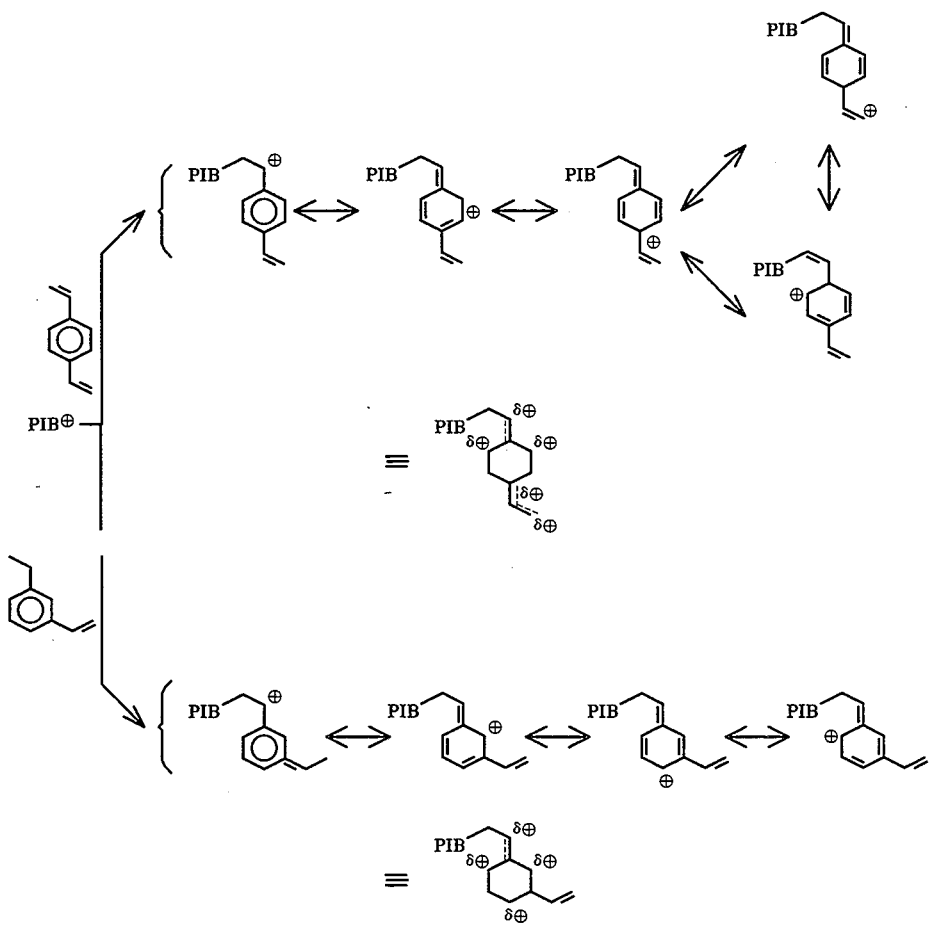

The subsequent event is core growth, which is in fact DVB homopolymerization. Since the concentration of DVB must be in excess in respect to the living DVB⊕s, more than one DVB molecule is expected to add to the growing ~DVB⊕. Reactions such as intra- and intermolecular reactions between DVB⊕ plus unreacted —C$_6$H$_4$—CH=CH$_2$ are not shown, but such reactions may occur.

3. Core Growth: DVB⊕ + DVB → ~DVB⊕

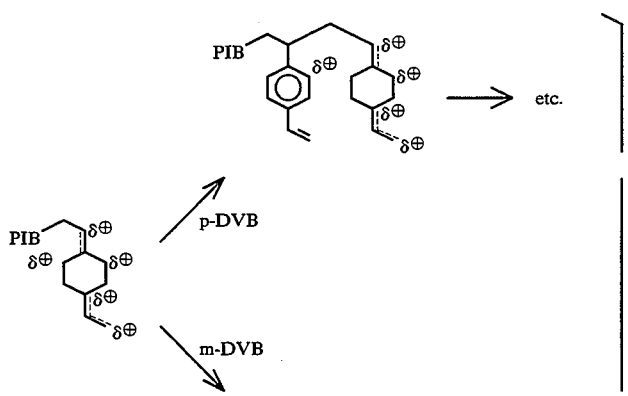

-continued

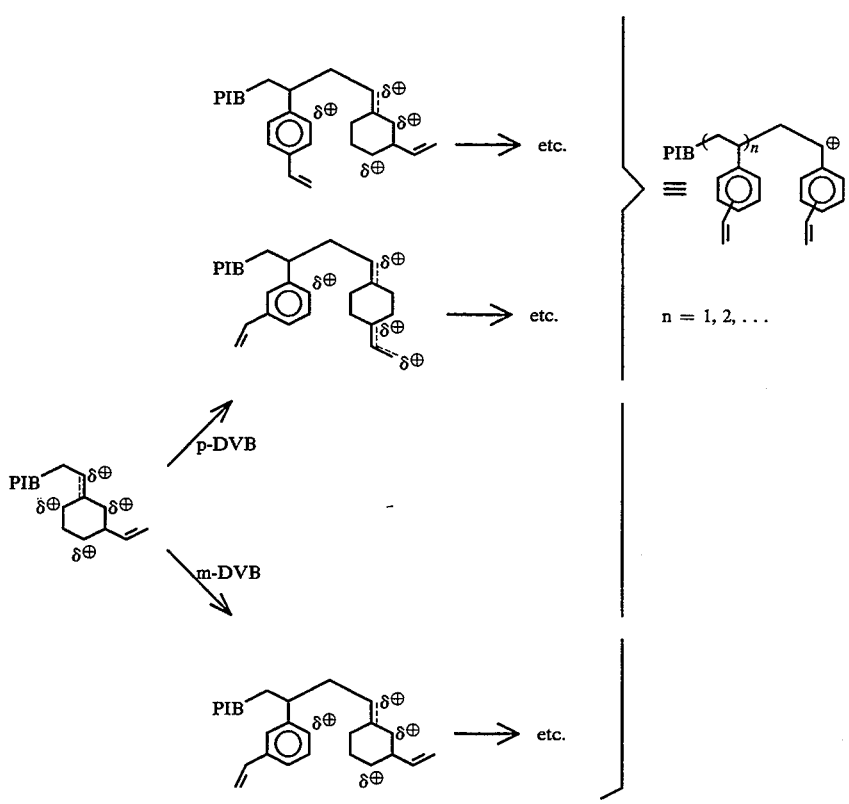

After and/or simultaneously with core growth, intermolecular linking to multi-arm stars proceeds by living PIB⊕ or PIB—DVB⊕ . (Steps 4.a and 4.b). Both species can react with —$C_6H_4$—CH=$CH_2$ groups except when they are terminal (i.e., —$CH_2$—CH⊕—$C_6H_4$—CH=$CH_2$). The reason for the reluctance of PIB⊕ or PIB—DVB⊕ to react with the latter species is due to resonance and inductive effects: Both resonance and inductive effects will prohibit reaction with the p-DVB⊕ while the inductive effect will prevent reaction with m-DVB⊕.

4. Intermolecular Linking to Multi-Arm Star
   a.) with PIB⊕

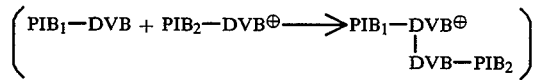

b.) with PIB—DVB⊕

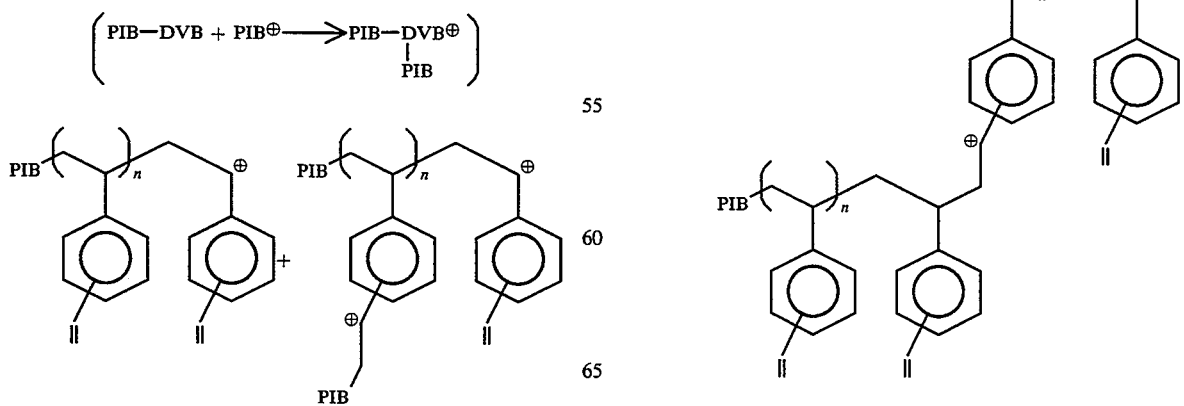

Ultimately, various intramolecular cyclizations, intermolecular star—star linkings, etc. are also expected to occur because of numerous —$C_6H_4$—CH=$CH_2$ groups and active cations in the core, whereas intermolecular star—star linking would be relatively slower due to reduced interdiffusion and steric hindrance.

5. Various Intramolecular Cyclizations (a) Intramolecular Cyclizations leading to Microgel in the Core

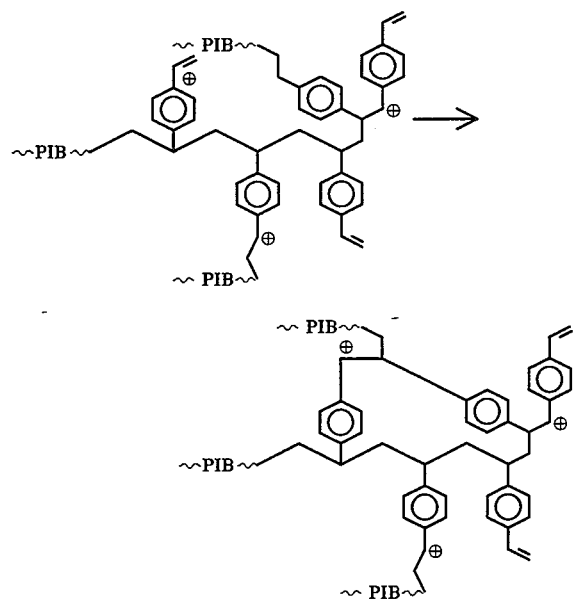

(b) Intermolecular Star—Star Linking

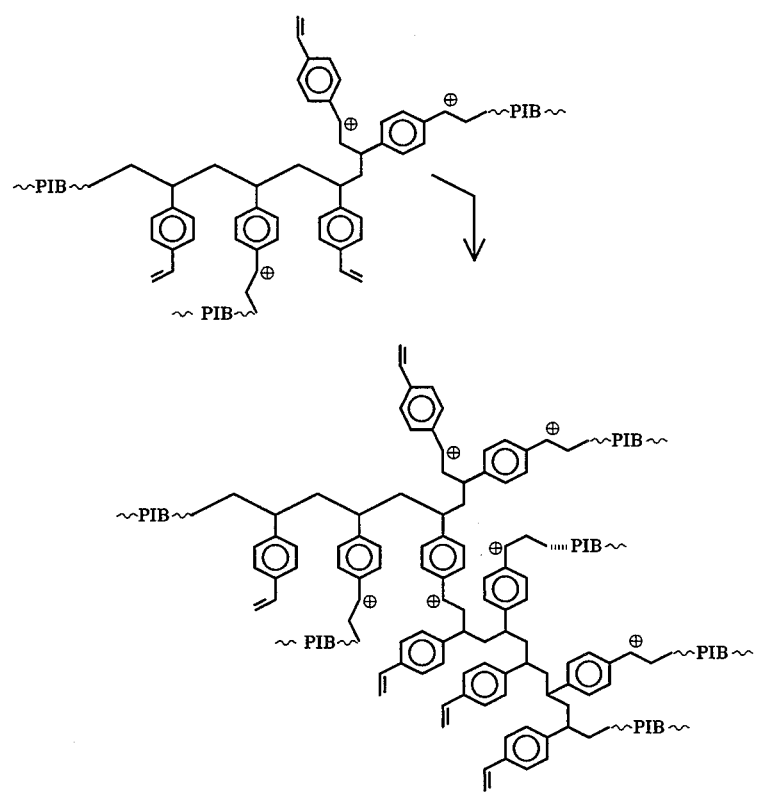

Results and Discussion

A large number and variety of orienting synthetic, kinetic, and characterization experiments were carried out. Among the many synthetic possibilities examined, good yields and relatively uncontaminated star-PIBs were obtained by the procedure described previously. Referring now to the drawings wherein the showings are for purposes of illustrating the preferred embodiment of the invention only and not for purposes of limiting the same, FIGS. 1 and 2 summarize, respectively, RI (GPC) traces and kinetic information collected in the course of a series of experiments. The 0 hr RI trace reflects the living PIB⊕s just before DVB addition ($V_c \approx 36.5$ mL corresponding to $\overline{M}_n = 6,500$ g/mole with $\overline{M}_w/\overline{M}_n = 1.23$). This "PIB peak", although relatively diminished, remains clearly visible in all the later RI traces as well. The RI and UV (GPC) traces (latters not shown) of the $\frac{1}{2}$, 2, and 3 hrs samples were very similar suggesting that the prominent shoulders at $V_c \approx 33.5$, 33.3, and 33.0 mL respectively, were due to star-PIB formation. by Steps 1-4 of Scheme 1. The small shift toward higher molecular weights of the $\frac{1}{2}$ hr. PIB peak is most likely due to the progressing addition of DVB units to the PIB⊕ segment. These DVB containing chains start to form stars by linking (Steps 3 and 4 of Scheme 1), whereas the PIB⊕s that have not added DVB units remain unchanged and the corresponding GPC peak shifts back to its starting position $V_c = 27-37$ mL range which is evidence for the overall similarity and uniformity oft he samples arising at long reaction times. Since the hydrodynamic volumes of multi-arm stars are insensitive to even relatively large molecular weight changes, the small but definitive shift of peaks toward lower values (i.e., from $V_c \approx 31$ to $\approx 30$ mL) of the 18-, 48-, and 96-hr GPC traces are viewed as strong indication for substantial molecular weight increase by slow intermolecular star—star linking (Step 5, Scheme 1).

FIG. 2 shows relative RI (GPC) peak areas reflecting star-PIB formation (•) and PIB⊕ disappearance (○) as a function of time. As anticipated, the rates of star-PIB formation and PIB⊕ disappearance are exactly the same. The sharp break in the rates at ~18 hrs indicates a change in the mechanism. We postulate in this range intermolecular star—star linking (Step 5, Scheme 1) becomes rate controlling. In contrast to relatively fast intermolecular arm-core linking (Step 4, Scheme 1), intermolecular star—star linking (Step 5, Scheme 1) is expected to be quite slow because of the difficult contact between individual active cores surrounded by dense inert PIB coronas.

Homopolymerization of DVB

Experiments were also performed to gain insight into the homopolymerization of DVB, modeling of Step 3, Scheme 1. These experiments were carried out under conditions used for the synthesis of star-PIB, expect the initiator for DVB polymerization was not living PIB⊕ but its model, TMP⊕. These experiments invariably gave discolored insoluble tightly-gelled PDVBs which were not further characterized. Importantly, however, the PDVB gel when subjected to "core destruction", gave non-detectable residues in ether.

Proof of Structure and Number of Arms of a star-PIB

Molecular Weight Determination Combined with Core Destruction

It is difficult to obtain direct proof of a star polymer. In most cases, e.g., with polystyrene and polybutadiene stars, the proof is often indirect and rests on various circumstantial evidences, one of which is, invariably, the expectation that the chemical reactions used for the synthesis are in fact taking place as planned. In the case of star-PIBs, a molecule in which multiple PIB arms are attached to a largely PDVB core, (the core is largely but not exclusively PDVB because even "High Purity" DVB contains ~18.5% EVB, which copolymerizes with DVB and thus becomes part of the core; this contribution to the core, however, can be neglected because the EVB does not sustain linking reactions), the presence of radial structure can be proven directly by the following sequence of steps:

(1) Determining the absolute molecular weight (for example by light scattering) of a sample which on the basis of the synthetic strategy used is expected to be a radial star-PIB;
(2) Selectively destroying the aromatic core which ties together the aliphatic PIB arms; and finally
(3) Determining the molecular weight of the surviving PIB fragments.

By dividing the molecular weight of the original star-PIB into that of the surviving PIB arms, we obtain the number of arms. Specifically, by dividing the number or weight average molecular weights of the sample ($\overline{M}_{n, \, star\text{-}PIB}$ or $\overline{M}_{w, \, star\text{-}PIB}$) into the number or weight average molecular weights of the surviving PIB arms ($\overline{M}_{n, \, PIB}$ or $\overline{M}_{w, \, PIB}$) respectively, we derive the number average and weight average number of arms: $\overline{N}_{n, \, arm}$ and $\overline{N}_{w, \, arm}$.

The radial structure of three-arm PIB stars, i.e., in which three PIB arms are held together by a central aromatic ring ("core"), has been proved by this methodology previously, as by J. P. Kennedy, L. R. Ross, J. E. Lackey, and O. Nuyken, Polym. Bull., 4(½), 67 (1981).

Experiments were also carded out to study the kinetics of core destruction. It was found that the PDVB core of a is completely destroyed in ~7 hrs under these conditions. Control experiments showed that PIB ($\overline{M}_n$=7,200 and 14,200 g/mole) survives conditions far more aggressive (refluxing for 236 hrs) than those used for core destruction, and that PDVB yields non-detectable residues in ether.

Table I summarizes the pertinent results.

TABLE 1

| | Data to Calculate $\overline{N}_{arm}$ of a Star-PIB | | |
|---|---|---|---|
| Time (hrs) | $M_n$ (g/mole) | $M_w$ (g/mole) | $M_w/M_n$ |
| 0 | (165,500) | (279,000) | (1.68) |
| 0 | 401,050* | 1,134,400* | 2.83* |
| 0.5 | (85,250) | (153,450) | ** |
| 1.0 | (8,300) | (53,500) | ** |
| 2.0 | (8,000) | (15,650) | (1.96) |
| 4.0 | (7,500) | (9,300) | (1.24) |
| 7.0 | 6,600 | 8,250 | 1.25 |
| 23.0 | 6,500 | 8,000 | 1.23 |

(Data in parentheses are very crude approximations obtained by using calibration valid for linear PIB)
*by light scattering; all other data by RI (GPC)
**bimodal distribution Evidently, the molecular weight of the sample decreases with increasing refluxing time and after ~7 hrs a limiting molecular weight, i.e., the molecular weight of the linear PIB arm, is reached. Since GPC calibration data for star-PIB molecular weights do not exist, the numbers in columns 2–4 merely reflect a decrease int he size (hydrodynamic volume) of the sample. In contrast, the last two data points at 7 and 23 hrs, when destruction is complete, reflect the true $\overline{M}_n$'s of the surviving linear arms ($\overline{M}_n$=6,600 and 6,500 g/mole).

The following simple calculation yields $\overline{N}_{n, \, arm}$ and $\overline{N}_{w, \, arm}$. According to these data, $\overline{M}_{n, \, PIB}$ of the surviving PIB arms after core destruction was 6,500 g/mole (Table 1) which is equivalent to $\overline{DP}_{n, \, PIB}$=116. The number of moles of aromatic moieties added (and completely consumed) per PIB arm were 12.5. Thus, the star-PIB contained (116/128.5)×100=~90.3 mole % (~78 wt. %) PIB and ~9.7 mole % (~22 wt. %) aromatic core. In other words, the star-PIB=401,050 g/mole (see Table 1) contained $\overline{M}_{n, \, PIB \, in \, star}$=362,150 g/mole plus $\overline{M}_{n, \, aromatic \, core}$=38,900 g/mole, or the $\overline{N}_{n, \, arm}$=(401,050×0.903)/6,500=56 PIB arms/star. Similarly, $\overline{N}_w$, arm=(1,134,400×0.78)/8,000=110. Since the $\overline{N}_{w, star\text{-}PIB}$ and $\overline{N}_{w, arm}$ values were determined by LS and RI (GPC) techniques, respectively, we consider $\overline{N}_n$, arm to be reliable. In contrast, the $\overline{M}_{n, \, star\text{-}PIB}$ value may be less accurate because it was calculated from $\overline{N}_{w, star\text{-}PIB}$ and using a rather broad molecular weight distribution ($\overline{M}_w/\overline{M}_n$=2.83).

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A star polymer comprising:
   (a) at least two molecules of a multifunctional linking agent selected from the group consisting of divinyl aromatics, trivinyl aromatics, diepoxides, diketones and dialdehydes which forms a core; and
   (b) three or more cationically polymerized polymer arms attached to the core, the polymer arms selected from the group consisting of homopolymers, copolymers, block copolymers having at least one polyolefin segment and at least one polyaryl segment, graft copolymers and mixtures thereof, and further wherein when the polymer arms are selected from the group consisting of homopolymers, copolymers and graft copolymers, the polymer arms are selected from the group consisting of polyisobutylene, poly(3-methyl-1-butene), poly(4-methyl-1-pentene) and poly($\beta$-pinene), and further wherein when the polymer arms are block copolymers, the at least one polyolefin segment is selected from the group consisting of polyisobutylene, poly(3-methyl-1-butene), poly(4-methyl-1-pentene) and poly($\beta$-pinene) and the at least one polyaryl segment is selected from the group consisting of polystyrene and alkylated polystyrene.

2. The star polymer of claim 1 wherein the divinyl aromatic is selected from the group consisting of 1,3-divinylbenzene, 1,4-divinylbenzene, 1,2-diisopropenylbenzene, 1,3-diisopropenylbenzene, 1,4-diisopropenylbenzene, 1,3-divinylnaphthalene, 1,8-divinylnaphthalene, 2,4-divinylbiphenyl, 1,2-divinyl-3,4-dimethylbenzene, 1,3-divinyl-4,5,8-tributylnaphthalene, 2,2'-divinyl-4-ethyl-4'-propylbiphenyl and mixtures thereof, and wherein the trivinyl aromatic is selected from the group consisting of 1,2,4-trivinylbenzene, 1,3,5-trivinylnaphthalene, 1,2,4-triisopropenylbenzene, 1,3,5-triisopropenylbenzene, 3,5,4'-trivinylbiphenyl, and 1,5,6-trivinyl-3,7-diethylnaphthalene, and wherein the diepoxide is selected from the group consisting of cyclohexane diepoxide, 1,4-pentane diepoxide, and 1,5-hexane diepoxide and wherein the diketone is selected from the group consisting of 2,4-hexane-di-one, 2,5-hexane-di-one, and 2,6-heptane-di-one, and the dialdehyde is selected from the group consisting of 1,4-butanedial, 1,5-pentanedial and 1,6-hexanedialdivinylbenzene.

3. The star polymer of claim 2 wherein the number of arms is at least seven.

4. A cationically synthesized star polymer comprising:
  (a) at least two molecules of a difunctional linking agent selected from the group consisting of m-divinyl benzene, p-divinylbenzene, 1,3-diisopropenylbenzene, 1,4-diisopropenylbenzene and mixtures thereof which form a core; and
  (b) at least three or more polyisobutylene arms attached to the core.

5. The star polymer of claim 4 wherein the number of arms is at least seven.

6. A cationically synthesized star polymer comprising:
  (a) at least two molecules of a difunctional linking agent selected from the group consisting of m-divinyl benzene, p-divinylbenzene, 1,3-diisopropenylbenzene, 1,4-diisopropenylbenzene and mixtures thereof which form a core; and
  (b) at least three or more block copolymer arms attached to the core and wherein the block copolymer comprises a polyolefin segment and a polyaryl segment.

7. The star polymer of claim 6 wherein the number of arms is at least seven.

8. The star polymer of claim 6 wherein the polyolefin is polyisobutylene and the polyaryl is selected from polystyrene and derivatives of polystyrene.

9. A star polymer which comprises:
  (a) a core consisting essentially of at least two molecules of a multifunctional linking agent selected from the group consisting of divinyl aromatics, trivinyl aromatics, diepoxides, diketones and dialdehydes, and at least one molecule of ethylstyrene; and
  (b) three or more cationically polymerized polymer arms attached to the core, the polymer arms selected from the group consisting of homopolymers, copolymers, block copolymers having at least one polyolefin segment and at least one polyaryl segment, graft copolymers and mixtures thereof, and further wherein when the polymer arms are selected from the group consisting of homopolymers, copolymers and graft copolymers, the polymer arms are selected from the group consisting of polyisobutylene, poly(3-methyl-1-butene), poly(4-methyl-1-pentene) and poly($\beta$-pinene), and further wherein when the polymer arms are block copolymers, the at least one polyolefin segment is selected from the group consisting of polyisobutylene, poly(3-methyl-1-butene), poly(4-methyl-1-pentene) and poly($\beta$-pinene) and the at least one polyaryl segment is selected from the group consisting of polystyrene and alkylated polystyrene.

10. The star polymer of claim 9 wherein the divinyl aromatic is selected from the group consisting of 1,3-divinylbenzene, 1,4-divinylbenzene, 1,2-diisopropenylbenzene, 1,3-diisopropenylbenzene, 1,4-diisopropenylbenzene, 1,3-divinylnaphthalene, 1,8-divinylnaphthalene, 2,4-divinylbiphenyl, 1,2-divinyl-3,4-dimethylbenzene, 1,3-divinyl-4,5,8-tributylnaphthalene, 2,2'-divinyl-4-ethyl-4-propylbiphenyl and mixtures thereof, and wherein the trivinyl aromatic is selected from the group consisting of 1,2,4-trivinylbenzene, 1,3,5-trivinylnaphthalene, 1,2,4-triisopropenylbenzene, 1,3,5-triisopropenylbenzene, 3,5,4'-trivinylbiphenyl, and 1,5,6-trivinyl-3,7-diethylnaphthalene, and wherein the diepoxide is selected from the group consisting of cyclohexane diepoxide, 1,4-pentane diepoxide, and 1,5-hexane diepoxide and wherein the diketone is selected from the group consisting of 2,4-hexane-di-one, 2,5-hexane-di-one, and 2,6-heptane-di-one, and the dialdehyde is selected from the group consisting of 1,4-butanedial, 1,5-pentanedial and 1,6-hexanedialdivinylbenzene.

11. The star polymer of claim 10 wherein the number of arms is at least seven.

12. A cationically synthesized star polymer comprising:
  (a) a microgel core consisting essentially of at least two molecules of a difunctional linking agent selected from the group consisting of 1,3-divinylbenzene, 1,4-divinylbenzene, 1,3-diisopropenylbenzene, 1,4-diisopropenylbenzene and mixtures thereof, the core additionally including ethylstyrene; and
  (b) at least three or more arms selected from the group consisting of homopolymers, copolymers, block copolymers, graft copolymers and mixtures thereof attached to the core.

13. The star polymer of claim 12 wherein the number of arms is at least seven.

14. A cationically synthesized star polymer consisting essentially of:
  (a) a microgel core consisting essentially of at least two molecules of a difunctional linking agent selected from the group consisting of 1,3-divinylbenzene, 1,4-divinylbenzene, 1,3-diisopropenylbenzene, 1,4-diisopropenylbenzene and mixtures thereof, the core additionally including ethylstyrene; and (b) at least three or more arms selected from the group consisting of homopolymers, copolymers, block copolymers, graft copolymers and mixtures thereof attached to the core.

15. The star polymer of claim 14 wherein the number of arms is at least seven.

16. A star polymer which comprises:

(a) a microgel core which comprises at least four molecules of a multifunctional linking agent selected from the group consisting of divinyl aromatics, trivinyl aromatics, diepoxides, diketones and dialdehydes and at least one molecule of ethylstyrene; and (b) three or more cationically polymerized polymer arms attached to the core, the polymer arms selected from the group consisting of homopolymers, copolymers, block copolymers having at least one polyolefin segment and at least one polyaryl segment, graft copolymers and mixtures thereof, and further wherein when the polymer arms are selected from the group consisting of homopolymers, copolymers and graft copolymers, the polymer arms are selected from the group consisting of polyisobutylene, poly(3-methyl-1-butene), poly(4-methyl-1-pentene) and poly($\beta$-pinene), and further wherein when the polymer arms are block copolymers, the at least one polyolefin segment is selected from the group consisting of polyisobutylene, poly(3-methyl-1-butene), poly(4-methyl-1-pentene) and poly($\beta$-pinene) and the at least one polyaryl segment is selected from the group consisting of polystyrene and alkylated polystyrene.

17. The star polymer of claim 16 wherein the divinyl aromatic is selected from the group consisting of 1,3-divinylbenzene, 1,4-divinylbenzene, 1,2-diisopropenylbenzene, 1,3-diisopropenylbenzene, 1,4-diisopropenylbenzene, 1,3-divinylnaphthalene, 1,8-divinylnaphthalene, 2,4-divinylbiphenyl, 1,2-divinyl-3,4-dimethylbenzene, 1,3-divinyl-4,5,8-tributylnaphthalene, 2,2'-divinyl-4-ethyl-4'-propylbiphenyl and mixtures thereof, and wherein the trivinyl aromatic is selected from the group consisting of 1,2,4-trivinylbenzene, 1,3,5-trivinylnaphthalene, 1,2,4-triisopropenylbenzene, 1,3,5-triisopropenylbenzene, 3,5,4'-trivinylbiphenyl, and 1,5,6-trivinyl-3,7-diethylnaphthalene, and wherein the diepoxide is selected from the group consisting of cyclohexane diepoxide, 1,4-pentane diepoxide, and 1,5-hexane diepoxide and wherein the diketone is selected from the group consisting of 2,4-hexane-di-one, 2,5-hexane-di-one, and 2,6-heptane-di-one, and the dialdehyde is selected from the group consisting of 1,4-butanedial, 1,5-pentanedial and 1,6-hexanedialdivinylbenzene.

18. The star polymer of claim 16 wherein the homopolymer is a polyolefin.

19. The star polymer of claim 18 wherein the polyolefin is polyisobutylene.

20. The star polymer of claim 17 wherein the number of arms is at least seven.

21. The star polymer of claim 3 wherein a ratio of a cationic polymerization initiator to the multifunctional linking agent is at least 5 to 1.

22. The star polymer of claim 21 wherein the ratio is at least 10:1.

23. The star polymer of claim 5 wherein a ratio of a cationic polymerization initiator to the multifunctional linking agent is at least 5 to 1.

24. The star polymer of claim 23 wherein the ratio is at least 10:1.

25. The star polymer of claim 8 wherein a ratio of a cationic polymerization initiator to the multifunctional linking agent is at least 5 to 1.

26. The star polymer of claim 25 wherein the ratio is at least 10:1.

27. The star polymer of claim 11 wherein a ratio of a cationic polymerization initiator to the multifunctional linking agent is at least 5 to 1.

28. The star polymer of claim 27 wherein the ratio is at least 10:1.

29. The star polymer of claim 15 wherein a ratio of a cationic polymerization initiator to the multifunctional linking agent is at least 5 to 1.

30. The star polymer of claim 29 wherein the ratio is at least 10:1.

31. The star polymer of claim 20 wherein a ratio of a cationic polymerization initiator to the multifunctional linking agent is at least 5 to 1.

32. The star polymer of claim 31 wherein the ratio is at least 10:1.

* * * * *